Jan. 27, 1942.  J. MANTELET  2,271,175
PORTABLE ROTARY GRATER
Filed Aug. 4, 1939  3 Sheets-Sheet 2
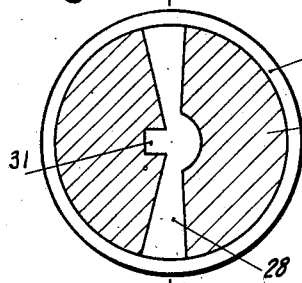
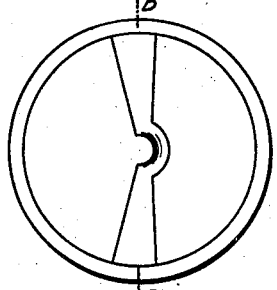
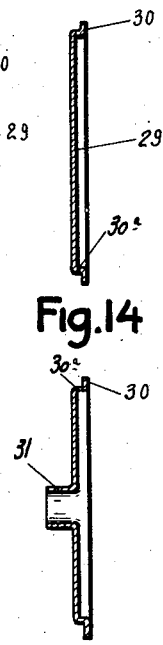
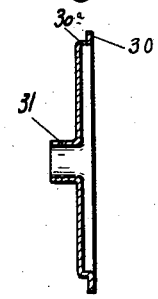
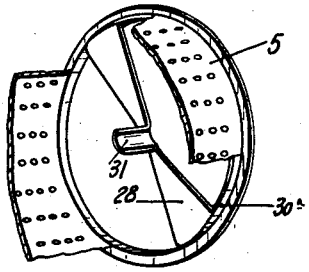
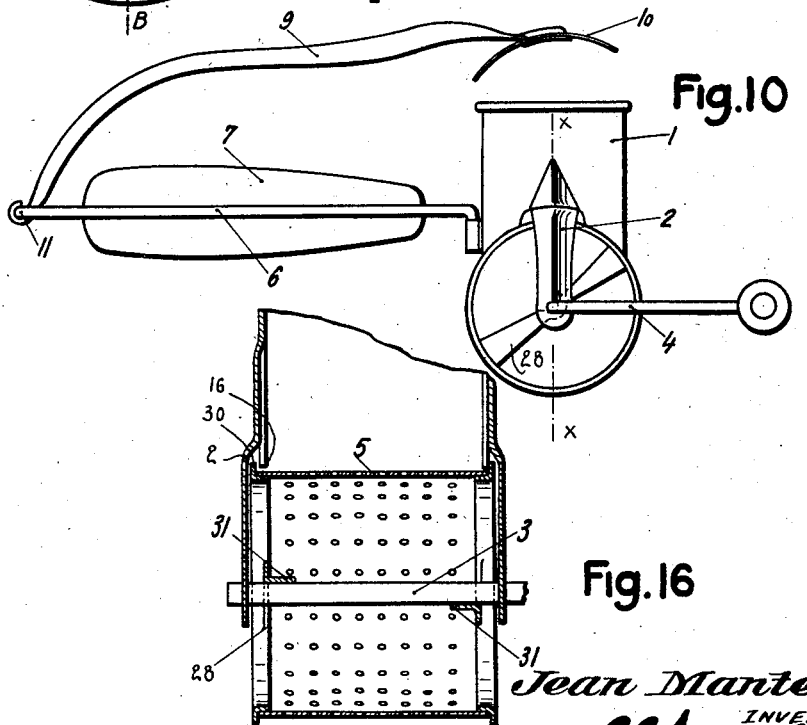
Jean Mantelet
INVENTOR,
By ATTORNEYS.

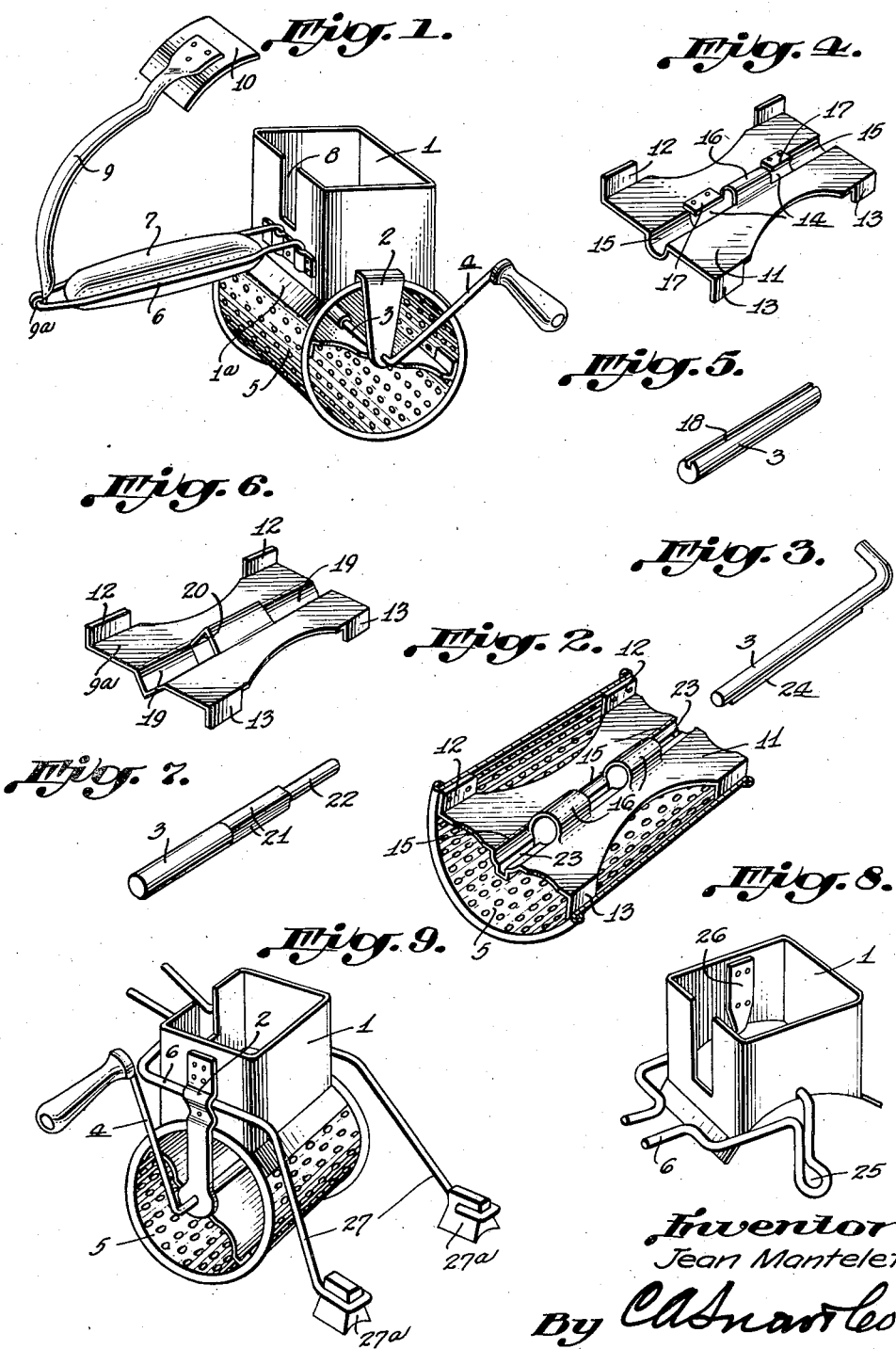

Jan. 27, 1942.     J. MANTELET     2,271,175
PORTABLE ROTARY GRATER
Filed Aug. 4, 1939     3 Sheets-Sheet 3
Fig.17
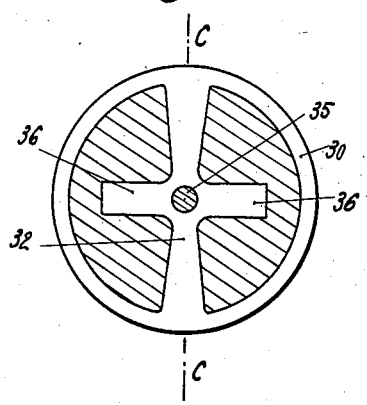
Fig.18
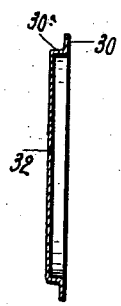
Fig.19
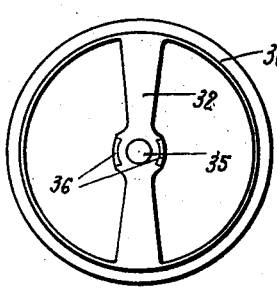
Fig.21
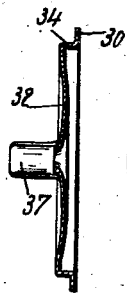
Fig.20
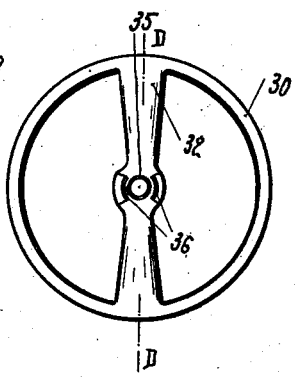
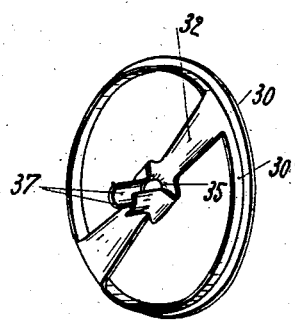
Fig.22
Jean Mantelet
INVENTOR,
By *CASnowKoo.*
ATTORNEYS.

Patented Jan. 27, 1942

2,271,175

UNITED STATES PATENT OFFICE 2,271,175

PORTABLE ROTARY GRATER

Jean Mantelet, Bagnolet, France, assignor to Mantelet & Boucher, Bagnolet, Seine, France Application August 4, 1939, Serial No. 288,443
In Luxemburg December 30, 1938

4 Claims. (Cl. 146—177)

It is known that rotary graters are, in general, formed by a cylindrical drum which forms a grater at its periphery and is lodged in a cylindrical case which surrounds the periphery of the grater and into which opens the hopper containing the substance to be grated and the pressure member. One end of the grater drum is open, and also the corresponding face of the case, in order to allow the grated substance to come out. The other end of the grater drum is provided with a closure member on which the shaft of the crank is fixed; said shaft passes through the corresponding face, forming a bearing, of the case. The formation of the case surrounding the drum gives rise to drawbacks in use and encumbers the apparatus. Furthermore, in graters thus constructed, the rotary drum is mounted with an overhang relatively to its driving shaft; it therefore operates under conditions which are so much the worse as it is subjected by the pressure member to a stress perpendicular to its axis. The bearing that it is customary to provide on such graters, that is of comparatively great length and increases their weight, does not prevent these devices from wearing quickly and thereby becoming useless.

It is the object of the present invention to obviate these drawbacks; it provides a portable grater provided with a hopper which is secured to a handle and supports the rotary drum that is driven by the crank and that has its free surface outside the hopper which covers less than half the periphery of said drum. The hopper is provided with two lateral ears which form bearings for the shaft of the crank at the two ends of the drum. Said shaft is in turn connected to the drum by suitable supporting and driving means.

A number of embodiments are given by way of example in the accompanying drawings in which:

Fig. 1 is a perspective view of a grater according to the invention;

Figs. 2 and 3 respectively show the cross-piece of the drum according to Fig. 1 and the end of the shaft of the crank;

Figs. 4, 5 and 6, 7 respectively show two other manners of constructing the cross-piece and the shaft of the crank;

Fig. 8 shows a modification of construction of the supporting ear;

Fig. 9 shows a perspective view of another grater according to the invention, provided with rests;

Fig. 10 is a side view of another embodiment of the grater according to the invention;

Figs. 11 and 12 respectively show a plan view and a section through AA of Fig. 11, of a cut out blank intended for the construction of a cheek of the drum of the grater shown in Fig. 10;

Figs. 13 and 14 respectively show a plan view and a section through BB of Fig. 13, of said blank after stamping;

Fig. 15 shows a broken away perspective view of another embodiment of a cheek according to the invention;

Fig. 16 is a partial axial section of the grater according to Fig. 10, showing the drum mounted by means of the cheeks according to Figs. 11 to 14 or 15;

Figs. 17 and 18 respectively show a plan view and a section through CC of Fig. 17, of the cut out blank intended for manufacturing an embodiment of a cheek;

Fig. 19 shows a plan view of the cheek at an intermediate stage;

Figs. 20 and 21 respectively show a plan view and a section through DD of Fig. 20, of the finished cheek, and Fig. 22 shows a perspective view of same.

The grater shown in Fig. 1 comprises a container or hopper I secured to two lateral ears 2 supporting the shaft 3, that terminates in a crank 4, of a drum 5 which forms a grater at its periphery. The hopper I, which is of rectangular cross-section and follows with its lateral edges the contour of the drum, covers at the most one half of the area of said drum. The edges of said hopper which are parallel with the shaft of the drum are provided with flanges Ia, by means of which the substance to be grated that may escape from the hopper under said edges, is grated between the drum and the corresponding flange Ia. Said hopper carries, fixed in the loop formed by a suitably bent wire 6, the handle 7. It is provided on its rear face with a slot 8 which extends parallel with its axis and is intended to allow the arm 9 of the pressure member 10 to pass in known manner, which arm is pivotally mounted at 9a at the end of the loop 6.

Figs. 2 and 3 show a first embodiment of the cross-piece 11, by means of which the drum 5 is supported by the shaft 3 of the crank and which increases the rigidity of the structure. The cross-piece 11 is provided on the one hand, on its two large sides, with tongues bent at right angles 12 and 13 which are intended to be soldered on the internal face of the grater and, on the other hand with stamped axial bearing surfaces 15 and 16 respectively projecting alternately from each face of the cross-piece and adapted to fit the periphery of the shaft 3. In the bottom of the bearing surfaces 15 is provided a groove 23 which is adapted to receive a longitudinal projection 24 (Fig. 3) of the shaft 3 and to effect the drive of the drum. The journal hole of one of the ears of the hopper is provided with a slot similar to the groove 23, in order to enable the shaft to be inserted.

In Figs. 4 and 5, openings 14 are provided between the bearing surfaces 15 and 16; plates 17 soldered on the edges of the openings into which they project, act as keys and, by penetrating into a groove 18 provided longitudinally in the shaft 3, effect the drive of the drum.

In the embodiment shown in Figs. 6 and 7, the bearing surfaces are provided with flat portions 19 and 20 to which there correspond flat portions 21 of the shaft (Fig. 7); the cylindrical end 22 of the shaft is in this case of smaller diameter than the opposite end.

In Fig. 8, the wire 6 which holds the handle 7, is bent round as shown in the figure, so as to form a loop 25 in which the shaft is journalled; the flattened end 26 of the wire is soldered on the inner wall of the hopper.

In the embodiment shown in Fig. 9, the lateral ears 2 forming a support for the shaft are separate members and hold the wire 6, the ends of which are turned downwards so as to form two feet 27 provided with block 27a of rubber or the like.

In the grater shown in Fig. 10, the drum is not connected to its shaft by a cross-piece like those hereinbefore described, but by diametrical struts 28 fixed at the ends thereof. The method of manufacturing said struts will now be described.

Said strut is obtained from a metal blank 29 which is laid flat (Figs. 11 and 12) and whereof the projecting flange 30 and the annular outer bearing surface 30a are stamped out, and then the hatched parts are cut out, leaving the diametrical strut 28 with a perpendicular projection 31. A subsequent stamping operation converts the projection 31 into a semi-cylindrical axial bearing surface adapted to fit the shaft 3 of the crank on which it is soldered. (Figs. 13 and 14.)

In assembling, the two lateral cheeks are held by suitable means in such a manner that their respective axial bearing surfaces 31 are located diametrically opposite each other (as shown in Fig. 16), so as to obtain a satisfactory balance of the drum; then the metal plate which is to form the drum 5 is wound round the annular bearing surface 30a and fixed thereto by soldering. In the assembled grater, the flanges 30 of the struts are clamped between the base of the ears 2 and the edges 16 of the hopper which are adjacent the drum, thereby axially supporting the drum and preventing the substance from leaking out of the hopper.

This embodiment of the grater is remarkable for its ruggedness and its low cost of manufacture.

According to another embodiment (Figs. 17 to 22) of a cheek obtained from a flat metal blank, after a first stamping operation has formed the projecting flange 30 and the outer annular bearing surface 30a (Figs. 17 and 18), the hatched portions are punched out so as to leave a diametrical strut 32 having a central hole 35 and two tongues 36. By means of the next operation, said tongues are bent over and curved, as shown in Fig. 19, at the same time as the arms 32 are likewise curved to increase their rigidity. Finally, a last operation also curves the tongues 36 as shown in Figs. 20 and 21, and suitably bends them closer together, in such a manner as to form two opposite bearing surfaces adapted to receive and centre the shaft of the drum (which passes through the hole 35), to which they are then secured by soldering, for example. The edges of the hole 35 are at the same time drawn out so as to enlarge the hole. It is however possible to omit the intermediate operation which produces the state shown in Fig. 19. The perforated metal sheet which is intended to form the grating member proper is wound and soldered on the lateral bearing surface 30a of the two cheeks, as stated above.

While I have illustrated and described the preferred forms of construction for carrying my invention into effect, these are capable of variation and modification, without departing from the spirit of the invention. I therefore do not wish to be limited to the precise details of construction set forth, but desire to avail myself of such variations and modifications as come within the scope of the appended claims.

I claim:

1. A grater of the type described, comprising in combination, a rotary cylindrical grater drum having outwardly radially projecting rims at its ends, a crankshaft extending through said drum, spider means for securely carrying said drum on said shaft, a hopper for the substance to be grated, mounted with and adjacent to one side of the drum, covering less than half of the periphery of same and having at its outlet a pair of opposite straight faced edges parallel with said shaft and a pair of opposite arcuate side edges generally at right angles to the straight faced edges and adjacent said drum rims, said edges slightly spaced from the drum and thus providing gaps between them and the adjacent surface elements of the drum, flanges at said straight hopper edges, extending outwards parallel with the drum so as to cause any substance that might leak through the respective gaps to be grated when passing under said flanges, said drum rims being adapted to close the gaps at the arcuate side edges of the hopper, the surface of said drum being free outside the hopper with its said flanges, and means secured to said hopper for holding same and means secured to the holding means for pressing the substance in the hopper toward the drum.

2. A grater of the type described, comprising in combination, a rotary cylindrical grater drum having outwardly radially projecting rims at its ends, a crankshaft extending through said drum, spider means including hub elements for securely carrying said drum on said shaft, a hopper for the substance to be grated, mounted with and adjacent to one side of the drum, covering less than half of the periphery of same and having at its outlet a pair of opposite straight faced edges parallel with said shaft and a pair of opposite arcuate side edges generally at right angles to said straight edges and adjacent said drum rims, said edges slightly spaced from the drum and thus providing gaps between them and the adjacent surface elements of the drum, means at said straight edges for preventing leakage of ungrated substance through the respective gaps, said drum rims being adapted to close the gaps at said arcuate edges, the surface of the drum being free outside the hopper, means secured to the hopper for holding same and means secured to the holding means pressing the substance in the hopper toward the drum, and a pair of bearing means secured to said hopper for supporting therefrom said shaft with the drum secured thereto, said means respectively extending across both end rims of said drum in guiding engagement therewith and being materially spaced from said hub elements on said shaft between said bearing means.

3. A grater of the type described, comprising in combination, a rotary cylindrical grater drum having outwardly radially projecting rims at its ends, a crankshaft extending through said drum, a generally rectangular diametrical web across said drum, secured thereto at its four corners, having its axial edges between said corners materially spaced from the drum so as not to interfere with the grated substance passing through the drum and further having hub elements for securely carrying said drum on said shaft, a hopper for the substance to be grated, mounted with and adjacent to one side of the drum, covering less than half of the periphery of same and having at its outlet a pair of opposite straight faced edges parallel with said shaft and a pair of opposite arcuate side edges generally at right angles to said straight edges and adjacent said drum rims, said edges slightly spaced from the drum and thus providing gaps between them and the adjacent surface elements of the drum, flanges at said straight hopper edges, extending outwards parallel with the drum so as to cause any substance which might leak through the respective gaps to be grated when passing under said flanges, said drum rims being adapted to close the gaps at said arcuate edges, the surface of the drum being free outside the hopper, means secured to the hopper for holding same and means secured to the holding means pressing the substance in the hopper toward the drum, and a pair of bearing means secured to said hopper for supporting therefrom said shaft with the drum secured thereto, said means respectively extending across both end rims of said drum in guiding engagement therewith and being materially spaced from said hub elements on said shaft between said bearing means.

4. A grater of the type described, comprising in combination, a rotary cylindrical grater drum, a crank shaft extending through said drum, spider means at each end of said drum for securely carrying same on said shaft, each of said means including a rim having an angle section and providing a flange extending axially inwards into the respective end of the drum and another flange extending radially outwards, spider arms extending radially inwards from the axially inner edge of the axial flange and hub elements at the inner ends of said arms and turned axially inwards therefrom, a hopper for the substance to be grated, mounted with and adjacent to one side of the drum, covering less than half of the periphery of same and having at its outlet a pair of opposite straight faced edges parallel with said shaft and a pair of opposite arcuate side edges generally at right angles to said straight edges and adjacent said drum rims, said edges slightly spaced from the drum and providing gaps between them and the adjacent surface elements of the drum, flanges at said straight hopper edges, extending outwards parallel with the drum so as to cause any substance that might leak through the respective gaps to be grated when passing under said flanges, said radial spider flanges being adapted to close the gaps at said arcuate edges, the surface of the drum being free outside the hopper, means secured to the hopper for holding same and means secured to the holding means pressing the substance in the hopper toward the drum, and a pair of bearing means secured to said hopper for supporting therefrom said shaft with the drum secured thereto, said means respectively extending across both spider rims of said drum in guiding engagement therewith and being materially spaced from said hub elements on said shaft between said bearing means.

JEAN MANTELET.